(12) United States Patent
Hashemi

(10) Patent No.: US 7,160,101 B2
(45) Date of Patent: Jan. 9, 2007

(54) APPARATUS FOR HEATING A NOZZLE WITH RADIANT ENERGY

(75) Inventor: Hamid Reza Hashemi, Ontario (CA)

(73) Assignee: Mold-Masters Limited, Georgetown (CA)

( * ) Notice: Subject to any disclaimer, the term of this patent is extended or adjusted under 35 U.S.C. 154(b) by 378 days.

(21) Appl. No.: 10/801,672

(22) Filed: Mar. 17, 2004

(65) Prior Publication Data
US 2004/0185137 A1 Sep. 23, 2004

Related U.S. Application Data

(60) Provisional application No. 60/455,867, filed on Mar. 20, 2003, provisional application No. 60/455,868, filed on Mar. 20, 2003.

(51) Int. Cl.
*B29C 45/20* (2006.01)
(52) U.S. Cl. ................................. 425/549; 264/328.15
(58) Field of Classification Search ................. 425/549; 264/328.15
See application file for complete search history.

(56) References Cited

U.S. PATENT DOCUMENTS

| | | | |
|---|---|---|---|
| 3,704,723 A | 12/1972 | Wheaton, III et al. | |
| 4,386,272 A | 5/1983 | Check, Jr. et al. | |
| 4,600,375 A | 7/1986 | Honsho et al. | |
| 5,045,107 A | 9/1991 | Hubele | |
| 5,054,107 A | 10/1991 | Batchelder | |
| 5,645,867 A | 7/1997 | Crank et al. | |
| 6,305,923 B1 * | 10/2001 | Godwin et al. | 425/143 |
| 6,530,317 B1 | 3/2003 | Gelbart | |

FOREIGN PATENT DOCUMENTS

DE 32 45 826 C2 5/1984

OTHER PUBLICATIONS http://en.wikipedia.org/wiki/Pyrex, dated Jul. 31, 2006.*
Camn, D. M. et al., "Spike Thermal Processing Using Arc Lamps", Vortek Industries Ltd., date unknown.
Hashemi, Hamid, "Light Leaps Ahead", Feb. 18, 2003.
"CS Mounts", Preliminary Data Sheet NL-CSG, nLight Photonics, date unknown.
"High Power Stacks", Preliminary Data Sheet NL-SAG, nLight Photonics, date unknown.
"Fiber Coupled, Semiconductor Laser Bars", Spectra-Physics, date unknown.
"Open Heatsink, Semiconductor Laser Bars", Spectra-Physics, date unknown.
"High Power Spectral Line Lamps", Oriel Instruments, date unknown.
Takeichi, Akihiro et al., "Measurement of Change of Reflectance of Metal/GeS2 Systems during Laser Irradiation with Nanosecond Time Resolution", R & D Review of Toyota CRDL 38(3):14-20, date unknown.
Toshiba InfraRed Halogen Lamp Heater, Toshiba Lighting Products (France) S.A., date unknown.
Toshiba InfraRedQuartz Tube Heater, Toshiba Lighting Products (France) S.A., date unknown.

* cited by examiner

*Primary Examiner*—Tim Heitbrink
(74) *Attorney, Agent, or Firm*—Ridout & Maybee LLP

(57) ABSTRACT

A system and method provide an injection molding apparatus utilizing radiation energy as a heat source. The injection molding apparatus may includes at least a partially transparent nozzle or may include a thermally conductive nozzle having a nozzle body and a nozzle channel that receives a fluid material at an inlet. The fluid material has a pressure induced flow causing the fluid material to flow along an axis of the nozzle channel from the inlet to an outlet. A radiant energy heating device heats the nozzle channel to maintain the fluid material in a fluid state.

26 Claims, 4 Drawing Sheets

APPARATUS FOR HEATING A NOZZLE WITH RADIANT ENERGY

CROSS REFERENCE TO RELATED APPLICATIONS

This application claims benefit under 35 U.S.C. §119(e) to U.S. Provisional Patent Applications Nos. 60/455,867 and 60/455,868, which were both filed Mar. 20, 2003, and which are both incorporated by reference herein in their entireties.

BACKGROUND OF THE INVENTION

1. Field of the Invention

The present invention relates generally to an injection molding apparatus and, in particular, to a method and apparatus for heating a nozzle.

2. Related Art

Conventional hot runner nozzles often have an uneven distribution of heat along the length thereof when operating in an injection molding apparatus. Uneven heat distributions in nozzles are undesirable because with the increased use of more difficult to mold plastic materials, the melt must be maintained within narrower and narrower temperature ranges. If the temperature rises too high, degradation of the melt will result, and if the temperature drops too low, the melt will clog in the system and produce an unacceptable product. Both extremes can necessitate the injection molding apparatus being shut down for a clean out, which is a very costly procedure due to the loss of production time.

Conventional hot runner nozzles are typically comprised of a nozzle body that is formed from a thermally conductive metal. The nozzle body is surrounded by a heating element that is either in contact with an outer surface of the nozzle or embedded therein. The melt channel, which extends through the nozzle, is heated by the conduction of heat from the heating element.

Conduction is sometimes an inefficient method of heating. Conduction methods of heating can result in a rapid loss of heat as one moves away from the heat source. Further, heat loss occurs at any point of contact between the heated nozzle and a lower temperature part of the injection molding apparatus.

There have been many attempts to reduce the amount of heat loss from the nozzle during the injection process. Conventional solutions have generally been directed toward minimizing the amount of contact between the nozzle and the surrounding mold plates or providing insulation at these contact points. Several of these solutions have reduced the amount of heat loss from the nozzle, however, the method of heating the nozzle has not changed significantly. Also, if precision heating of a certain area of a hot runner nozzle is desired, heat by conduction is difficult to precisely direct and thus ineffective in such applications.

Therefore, what is needed is a system and method that include using a heating device that heats a nozzle, which can provide "remote/projected" precision heating through directed radiation energy from a radiant energy source. What is also needed is a system and method that allows the nozzle length to be increased without requiring modification of the nozzle heater.

SUMMARY OF THE INVENTION

An embodiment of the present invention provides an injection molding apparatus including a partially transparent nozzle having a nozzle body and a nozzle channel that receives a fluid material at an inlet, the fluid material having a pressure induced flow causing the fluid material to flow along an axis of the nozzle channel from the inlet to an outlet and a radiant energy heating device that heats the nozzle channel to maintain the fluid material in a fluid state.

Another embodiment of the present invention provides a method including the steps of receiving a pressure induced flow of a fluid material in a partially transparent nozzle, which has a nozzle body and a nozzle channel, that flows along an axis of the nozzle channel from an inlet to an outlet and using radiant energy to heat the nozzle channel to maintain the fluid material in a fluid state.

A further embodiment of the present invention provides an injection molding apparatus including a nozzle having a nozzle body and a nozzle channel that receives a fluid material at an inlet. The fluid material has a pressure induced flow causing the fluid material to flow along an axis of the nozzle channel from the inlet to an outlet. The apparatus also includes a radiant energy heating device that heats the nozzle channel to maintain the fluid material in a fluid state.

A still further embodiment of the present invention provides a method for heating a fluid flow in an injection molding process including the steps of (a) receiving a pressure induced fluid flow in a nozzle having a nozzle body and a nozzle channel, such that the fluid flows along an axis of the nozzle channel from an inlet to an outlet and (b) using radiant energy to heat the nozzle channel to maintain the fluid material in a fluid state.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention

The present invention will now be described with reference to the accompanying drawings. In the drawings, like reference numbers may indicate identical or functionally similar elements.

DETAILED DESCRIPTION OF THE PREFERRED EMBODIMENTS

First Exemplary Injection Molding Apparatus Using Radiant Energy to Heat

Figure 1:
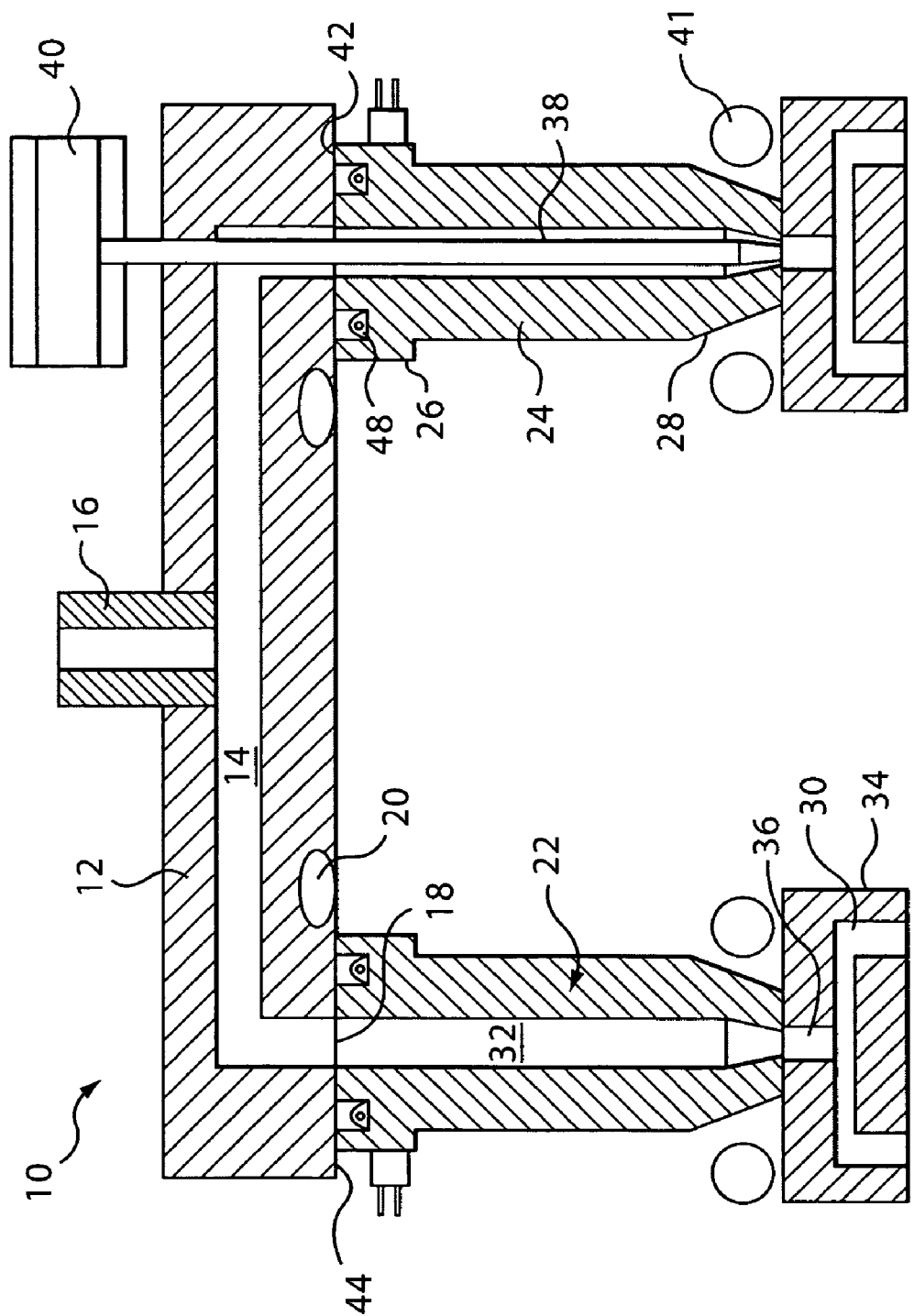
FIG. 1 is a side sectional view of an injection molding apparatus according to an embodiment of the present invention.

FIG. 1 shows an injection molding apparatus 10 according to an embodiment of the present invention. The injection molding apparatus 10 comprises a manifold 12 having a manifold channel 14 extending therethrough. A manifold bushing 16 is located at an inlet of the manifold channel 14 to receive a melt stream of moldable material from a machine nozzle (not shown). Melt flows through the manifold channel 14 and exits the manifold 12 through manifold outlets 18, which are provided in an outlet surface 44 of the manifold 12. Manifold heaters 20 are provided in the manifold 12 to maintain the melt stream at a desired temperature.

Nozzles 22 are located between the manifold 12 and respective mold cavities 30, which are formed in mold cavity plates 34. Each nozzle 22 includes a nozzle body 24, a nozzle head 26, and a nozzle tip 28. An inlet surface 42 of each nozzle 22 abuts the outlet surface 44 of the manifold 12 and a nozzle channel 32 extends through each nozzle to deliver melt from the manifold outlet 18 to the corresponding mold cavity 30.

Mold gates 36 are provided at the entrance to the mold cavities 30. The mold gates 36 are selectively openable to allow melt to be delivered to the mold cavities 30. The nozzles 22 may be thermal gated (shown on the left side of FIG. 1) or valve gated (shown on the right side of FIG. 1). The valve gated nozzles 22 include a valve pin 38 that is driven by a valve piston 40. Each valve pin 38 is selectively movable to open and close the respective mold gate 36. Cooling channels 41 are provided adjacent the mold cavities 30 to cool the melt therein.

Figure 2:
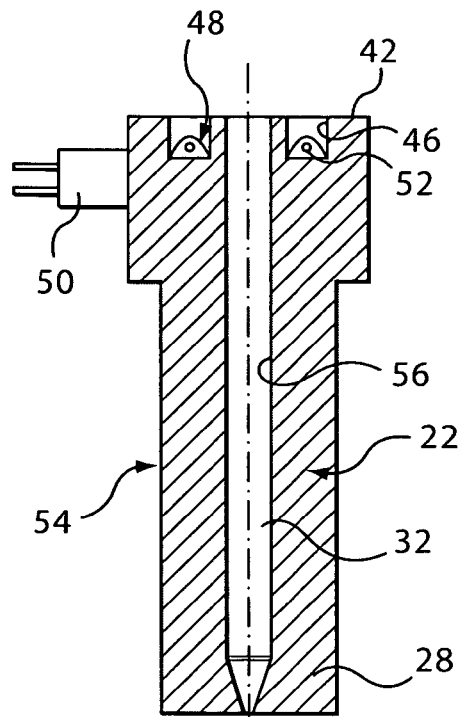
FIG. 2 is a side sectional view of a nozzle of FIG. 1.

FIG. 2 shows nozzle 22 according to an embodiment of the present invention. In this embodiment, nozzle 22 can include a cavity 46 that is formed in the inlet surface 42 thereof. In this embodiment, cavity 46 is generally a ring shaped channel that surrounds the nozzle channel 32. A radiant energy heating device 48 is located in the cavity 46. The radiant energy heating device 48 is powered via an electrical connector 50 from a power source (not shown). In this embodiment, the radiant energy heating device 48 is a substantially ring-shaped high intensity radiant energy that is oriented such that waves from the radiant energy heating device 48 are directed toward the nozzle tip 28.

In one embodiment, nozzle 22, or parts thereof, is at least partially transparent to allow radiant energy to pass therethrough. Through the description, transparent is used to mean made from a material that allows for substantially all of an infrared or longer/higher wavelength to pass through material with substantially little, if any, absorption of the wavelength. For example, nozzle 22 can be made of a glass-ceramic material.

In another embodiment, nozzle 22 is made from a thermally conductive material that absorbs radiant energy waves from radiant energy heating device 48, which causes the thermally conductive material to heat up. Then, heat transfer through the thermally conductive material heats a fluid flow in nozzle channel 32.

In some embodiments, an optical, or internally reflective, coating can cover an outer surface 54 of the nozzle 22. When used, the optical coating is provided to reflect the radiant energy that is emitted from the radiant energy heating device 48 and re-direct the radiant energy toward the nozzle channel 32. It is to be appreciated that the nozzle 22 may be made of other transparent materials, for example sapphire, fused silica, Pyrex, or optical glass materials, such as SF11, SF14 and BK7. Other materials that allow radiant energy to pass therethrough and are suitable for the high temperature and pressure conditions of an injection molding system may also be used.

The optical or internally reflective coating may be any type of reflective coating including, for example, high reflective coatings, dielectric total reflector coatings and special reflective coatings, which filter certain radiant energy frequencies. Alternatively, polished aluminum sheathing may be fused to the outer surface 54 of the nozzle 22.

An inwardly directed surface 56 of the nozzle channel 32 is coated with a non-reflective, or internally absorbing, coating to allow for absorption of radiant energy. Radiant energy, mostly in the infrared range, is absorbed by the non-reflective coating thereby increasing or maintaining the temperature of surface 56. Types of suitable non-reflective coatings include titanium carbide and other anti-reflective coatings. Alternatively, a dark metal sleeve may be provided in the nozzle channel 32. For example, the sleeve may be comprised of any dark metal tool steel. Because it is radiant energy from the infrared range, in this embodiment, that heats the nozzle channel 32, it will be appreciated that a non-reflective coating that absorbs infrared radiant energy may be selected for application on the surface of the nozzle channel 32.

In operation, the injection molding apparatus 10 is heated up from the cold condition, in which all of the components are at generally the same ambient temperature. Melt is injected from the machine nozzle into the manifold bushing 16 of the manifold 12. The melt flows through the manifold channel 14 into the nozzle channel 32 and is injected into the mold cavity 30. The melt is then cooled to produce finished molded parts.

The radiant energy heating device 48 heats the nozzle 22 through interaction of emitted radiant energy with nozzle 22 or the contents thereof. In one example, the radiant energy is reflected by the optical coating of the nozzle 22 and redirected toward the nozzle channel 32. When used, the non-reflective coating of the nozzle channel 32 absorbs the radiation energy of the infrared radiant energy, which allows for heating of the nozzle channel 32. The heated nozzle channel 32 then maintains the melt stream at a desired temperature as it passes through the nozzle 22. The nozzle body 24 provides insulation for the nozzle channel 32 because it is made of an insulating material. This reduces the amount of heat loss to the surrounding mold plates (not shown). In other embodiments, the melt stream can absorb the radiant energy directly in order to maintain the melt stream at a desired temperature.

By heating the nozzle 22 using radiant energy heating device 48, it will be appreciated by a person skilled in the art upon reading this description that the shape and length of the nozzle 22 may be easily modified without changing the heat source. The nozzle 22 may be made to any desirable length because heat energy may travel farther and/or be more efficiently transferred via radiation than through conduction. The nozzle body 24 may also be of a curved form because radiant heat energy can be directed in a curved path. The nozzle 22 can also be corrosion resistant.

Second Exemplary Injection Molding Apparatus Using Radiant Energy to Heat

Figure 3:
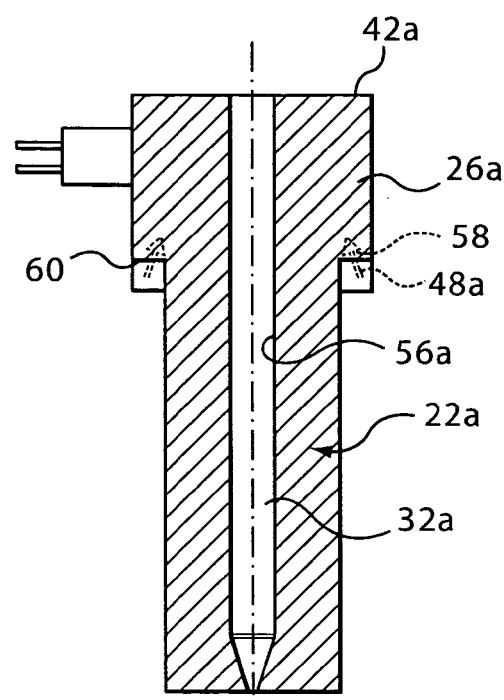
FIG. 3 is a side sectional view of a nozzle according to another embodiment of the present invention.

FIG. 3 shows another embodiment of a nozzle 22a according to the present invention. This embodiment is similar to the embodiment of FIGS. 1 and 2, however, radiant energy heating device 48a is in a different location. The radiant energy heating device 48a is coupled to a lower surface 60 of nozzle head 26a. In operation, radiant energy is emitted by the radiant energy heating device 48a in the direction indicated by arrows 58. The radiant energy is then reflected by inlet surface 42a and redirected throughout the nozzle 22a. In one embodiment, the radiant energy is absorbed by nozzle channel surface 56a, which includes a non-reflective coating, and the nozzle channel 32a is heated to maintain the melt in the nozzle channel 32a at a desired temperature. In another embodiment, the radiant energy is directly absorbed by the melt.

Figure 4:
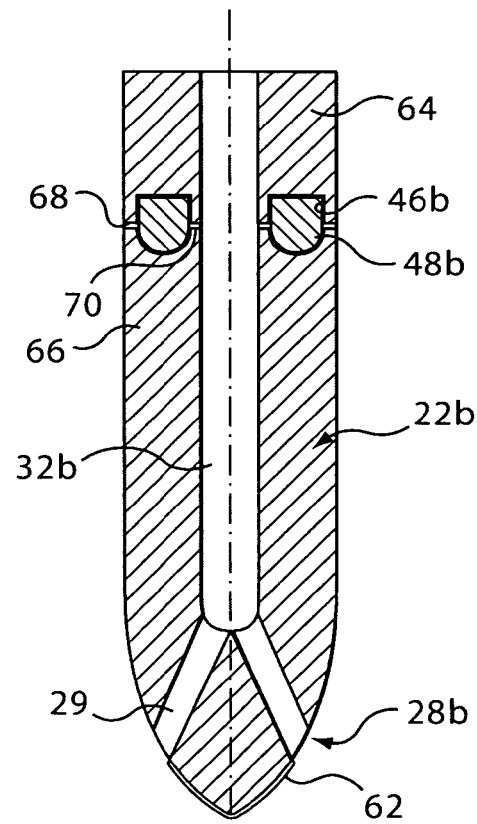
FIG. 4 is a side sectional view of a nozzle according to another embodiment of the present invention.

Exemplary Injection Molding Apparatus Using Radiant Energy to Heat a Two Part Nozzle FIG. 4 shows yet another embodiment of a nozzle 22b for an injection molding apparatus according to the present invention. This embodiment is similar to the embodiment of FIGS. 1, 2 and 3, however, radiant energy heating device 48b is in still a different location. Also, in this embodiment, the nozzle 22b can have a two-part construction including a first portion 64 and a second portion 66, which are coupled to one another. First and second mating surfaces 68 and 70 of the first and second portions 64, 66, respectively, abut one another to provide a continuous nozzle channel 32b. In one embodiment, a pair of radiant energy heating devices 48b is disposed in cavities 46b, which is at least partially formed in each of the mating surfaces 68, 70.

Nozzle tip 28b is a torpedo-type tip, which includes apertures 29 that allow melt to exit the nozzle 22b. In one embodiment, an internally radiant energy absorbing coating 62 covers the nozzle tip 28b. The nozzle channel 32b is heated by the radiant energy heating devices 48b in a manner that has been previously described in relation to the embodiment of FIGS. 1, 2, and 3. In this embodiment, the nozzle tip 28b is also heated. This is as a result of the internally radiant energy absorbing coating 62 of the nozzle tip 28b, which absorbs the emitted radiant energy, or through other interactions of the radiant energy with the nozzle tip. Providing additional heat to the nozzle tip 28b is desirable because heat is needed in the tip area to keep the polymer melt at the gate from prematurely freezing.

It will be appreciated by a person of ordinary skilled in the art upon reading this description that a non-reflective coating for the nozzle channel is preferred, however, it is not essential. For example, when molding with some low temperature plastic materials (e.g., Polyvinyl Chloride (PVC), additives, etc.), the melt itself may be able to absorb the radiant energy emitted from the radiant energy heating device, and thus be heated directly. This is in contrast to conventional devices in which the melt is indirectly heated, which is less efficient and has less temperature control. Another aspect of the present invention is that a nozzle body formed of glass is corrosion-resistant to often corrosive materials like PVC.

Figure 5A:
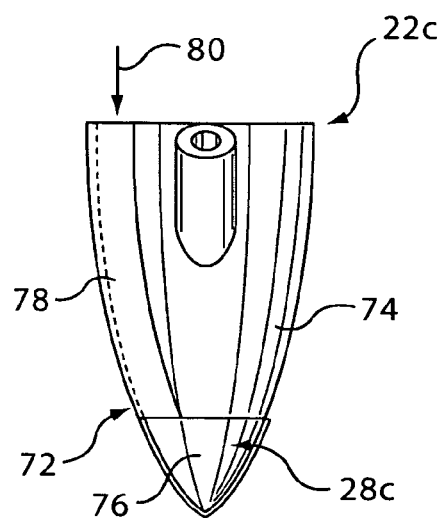
FIG. 5A is a side view of a nozzle portion according to still another embodiment of the present invention.
Figure 5B:
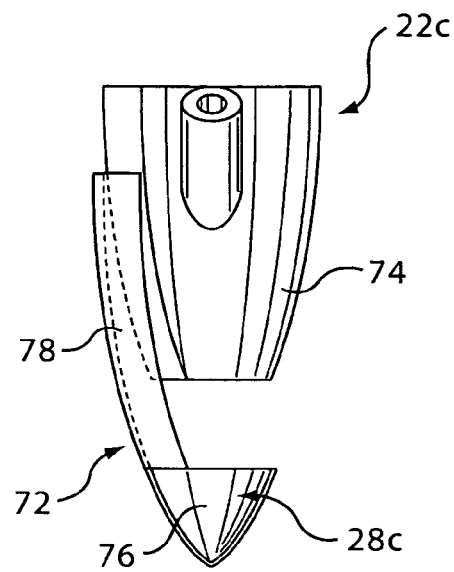
FIG. 5B is an exploded view of the nozzle portion shown in FIG. 5A.

Exemplary Injection Molding Apparatus Using Radiant Energy to Heat a Nozzle Tip Using a Waveguide FIGS. 5A and 5B show a nozzle tip 28c for a nozzle 22c according to an embodiment of the present invention. The nozzle tip 28c includes an end portion 72 that is coupled to an end portion 74 of the nozzle 22c by brazing, or any other suitable method.

FIG. 5B is an exploded view of FIG. 5A, which shows the nozzle tip end portion 72 separated from the nozzle end portion 74. The nozzle tip end portion 72 is a separate part that is heated independently from the rest of the nozzle 22c. Thus, nozzle 22c may be any type of nozzle that is heated in any manner known in the art. The nozzle tip end portion 72 includes a tip head 76 and a radiant energy guiding portion 78 (e.g., a waveguide, a fiber optical cable, a channel, etc.). In some embodiments, guiding portion 78 can be part of the tip head 76 and not a separate element. The nozzle tip end portion 72 is made from at least a partially transparent material (e.g., a glass-ceramic, etc). In one embodiment, tip head 76 is covered by a non-reflective or internally absorbing coating. Other suitable at least partially transparent materials for the nozzle tip end portion 72 include, for example, sapphire, fused silica, Pyrex, or optical glass materials such as SF11, SF14 and BK7.

In operation, a high intensity wave of radiant energy is directed into the radiant energy guiding portion 78, as indicated by arrow 80. The tip head 76 can then be heated through absorption of radiant energy from the high intensity wave. The intensity of the radiant energy emission may be controlled in order to maintain the nozzle tip 28c at a desired temperature. This is done through feedback of an actual temperature signal, or other known ways. For example, a temperature sensor (e.g., thermocouple) (not shown) can be positioned proximate the nozzle tip 28c and the signal detected by the temperature sensor is fed to a controller (not shown) that controls characteristics (e.g., power, operating time, etc.) of a radiant energy source.

In this embodiment, the temperature adjacent the mold gate is controlled accurately. In addition, the cycle time of the molding process may be reduced because the nozzle tip 28c is able to cool rapidly when the radiant energy intensity is reduced between injections. Having independent control of the tip temperature improves processing windows significantly and also allows for smaller gate sizes and cleaner vestiges. This is because being able to have better control of heat at the end of the tip substantially reduces or eliminates freezing of melt in a small gate that occurs in conventional devices.

It will be appreciated by a person skilled in the art upon reading this description that the nozzle tip end portion 72 may include more than one radiant energy guiding portion 78. For example, in an alternative embodiment a high intensity wave is directed into the nozzle tip from two opposing radiant energy guiding portion 78 (not shown).

Figure 7:
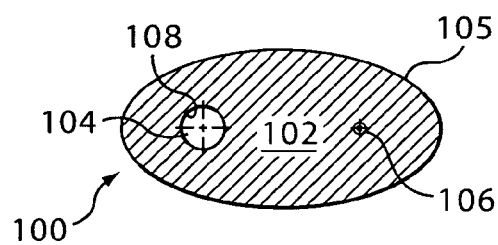
FIG. 7 is a cross-sectional view along line A—A of FIG. 6.
Figure 6:
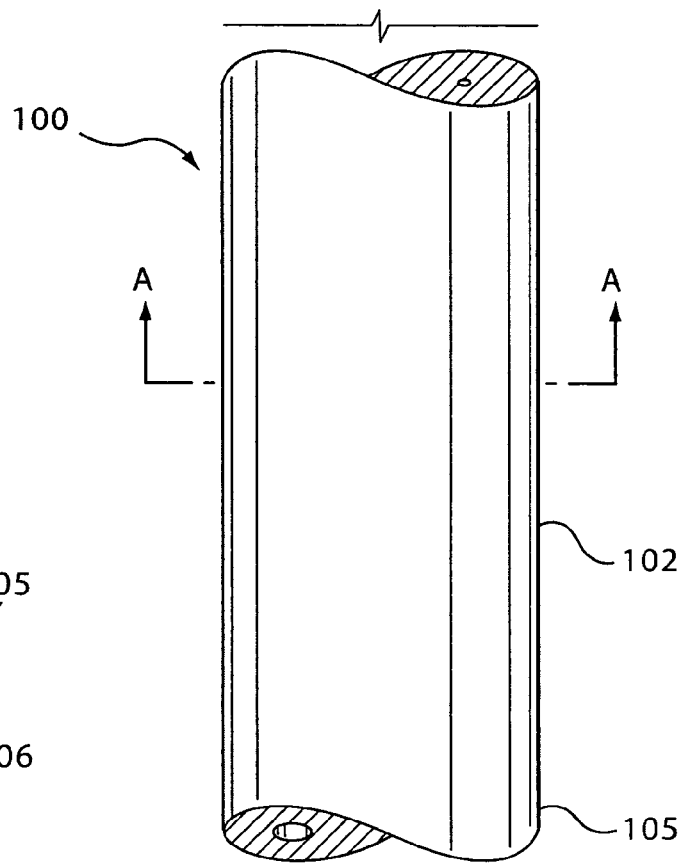
FIG. 6 is an isometric view of a polymer channel according to an embodiment of the present invention.

Exemplary Injection Molding Apparatus Using Radiant Energy to Heat Having a Nozzle with Elliptical Cross Section FIGS. 6 and 7 illustrate a nozzle 100 according to an embodiment of the present invention. Nozzle 100 is a polymer runner. The polymer runner 100 can include a transparent runner body 102 having a melt channel 104 extending therethrough. A radiant energy heating device 106 is spaced from the melt channel 104 and extend at least partially through a bore provided in the runner body 102. The radiant energy heating device 106 is substantially parallel to the melt channel 104. As shown in FIG. 7, the runner body 102 can have a substantially elliptical cross-section, in which the melt channel 104 and radiant energy heating device element 106 are positioned at focal points and along focal point axes thereof.

In one embodiment, the transparent runner body 102 is made from, for example, glass-ceramic and is covered by an optical or internally reflective coating. The transparent runner body 102 may alternatively be made from, for example, sapphire, fused silica, Pyrex, or optical glass materials such as SF11, SF14 and BK7. The optical coating, when used, may be any type of reflective coating including, for example, high reflective coatings, dielectric total reflective coatings and special reflective coatings, which filter certain radiant energy frequencies. In an alternative embodiment, polished aluminum sheathing or gold for better IR reflectance may be fused to an outer surface 105 of the runner body 102.

In one embodiment, an inwardly directed surface 108 of the melt channel 104 can include a non-reflective or internally absorbing coating, which can allow for absorption of radiant energy. When used, the non-reflective coating can allow radiant energy in the infrared range to be converted into heat. In an alternative embodiment, a dark metal sleeve may be provided in the melt channel 104 instead of a non-reflective coating to absorb radiant energy. The dark metal sleeve is constructed of any tool steel, for example.

In one embodiment, the radiant energy heating device 106 is an elongated element made from, for example, halogen-quartz. The radiant energy heating device 106 is capable of emitting radiant energy from the entire outer surface thereof.

Radiant energy heating devices 48, 48a, 48b, or 106 may also be, for example, heat emitters, infrared emitters, infrared tubes, compact industrial 2-wire infrared temperature transmitters, such as manufactured by Omega Engineering, Stamford, Conn., infrared fiber optic transmitters, CW diode lasers, such as manufactured by Spectra-Physics-Semiconductor Laser (previously Opto Power Corp.) of Mountain View, Calif., and the like, as would become apparent to one of ordinary skill in the art upon reading this description. As another example, radiant energy heating device 106 can include any energy source capable of emitting infrared or higher waves.

In one embodiment, during operation the radiant energy heating device 106 emits radiant energy from the first focal point of the ellipse shaped nozzle 100. The radiant energy is emitted radially outward from the entire circumference of the radiant energy heating device 106. When used, the internally reflective coating on the elliptical outer surface 105 of the runner body 102 redirects the radiant energy toward the melt channel 104, which is located at the second focal point of the ellipse shaped nozzle 100. The radiant energy is directed towards the melt channel 104 from all directions. When used, the non-reflective coating of the melt channel 104 can absorb the thermal radiation energy of the radiant energy, possibly in the infrared range, thereby heating the melt channel 104. The heated melt channel 104 in turn heats a melt flowing therethrough.

The polymer runner 100 allows the melt channel to be heated very efficiently because the radiant energy emitted at the first focal point of the ellipse becomes concentrated at the second focal point of the ellipse along the entire length of the melt channel 104. This arrangement provides rapid heating and high temperature capabilities.

The polymer runner 100 may be incorporated into a nozzle or a manifold. The polymer runner 100 may also be incorporated at any other location in an injection molding apparatus having a heated channel. Another application for the polymer runner 100 is to provide heat to a barrel of an injection molding machine, which would result in minimal dissipation of heat to the atmosphere.

In this embodiment, using an elliptical shape for polymer runner 100 allows radiation to radiate outwards in all directions and the reflected waves to be absorbed by the melt channel from all directions. This is in contrast to a semicircular shaped polymer runner that only allows specific angles to reach the melt channel, and not all angles. Thus, when using a semicircular shaped polymer runner, more than one radiant energy heating device might be needed to have all angles of incidence reach the melt channel.

Figure 8:
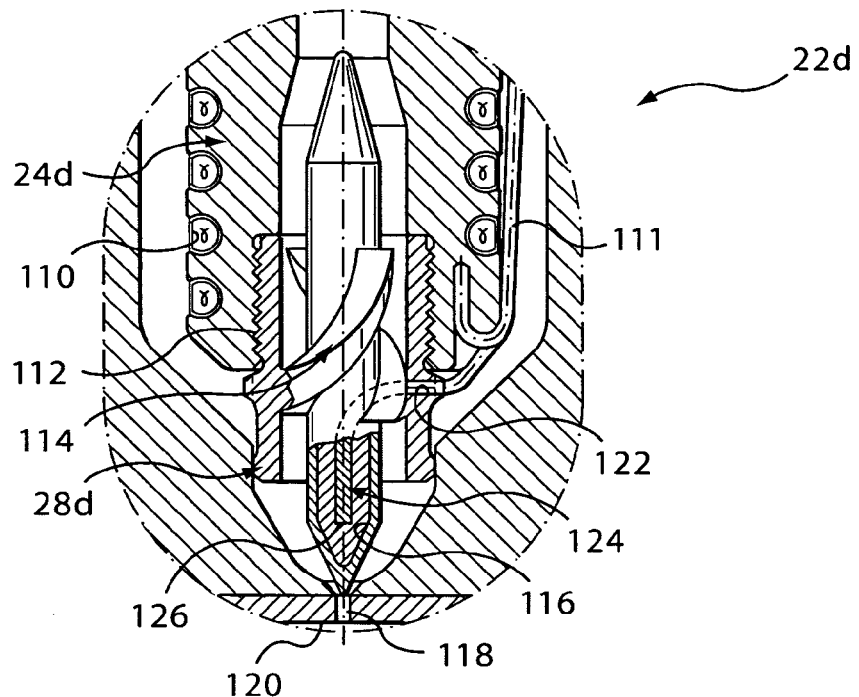
FIG. 8 is a side view partly in section of another embodiment of the present invention.

Exemplary Injection Molding Apparatus Using Radiant Energy to Heat Having a Nozzle Tip Using a Waveguide FIG. 8 shows a nozzle 22d according to an embodiment of the present invention. The nozzle 22d includes a nozzle body 24d that is heated by an embedded heater 110. A thermocouple 111 is coupled to the nozzle body 24d to measure the temperature thereof. A recess 112 is provided in the nozzle body 24d for receiving a nozzle tip 28d. In one embodiment, the nozzle tip 28d is a torpedo-type tip, which includes spiral blades 114 for directing melt around a tip head 116, through a mold gate 118, and into a mold cavity 120. An aperture 122 is provided in the nozzle tip 28d for receiving a waveguide 124 (e.g., a fiber optic cable) that transmits radiant energy from a radiant energy source (not show) to a distal end 126 of waveguide 124. The waveguide 124 is fed through the aperture 122 and does not contact the melt. Distal end 126 of the waveguide 124 is located in the tip head 116. In one embodiment, the nozzle tip 28d, or a portion thereof, may be formed from a good conductor, for example, Beryllium Copper or the like.

In operation, a radiant energy wave is emitted from the distal end 126 of the waveguide 124. The infrared radiant energy of the radiant energy wave is absorbed by the tip head 116 and converted into thermal energy (e.g., heat).

The radiant energy wave can provide focused, precision heating of the nozzle tip 28d. This is in contrast to conventional systems that rely on conduction of heat from the nozzle body to the tip, which is substantially less effective since the temperature significantly decreases along the nozzle body as the heat is conducted away from the heat source. By using waveguide 124 heat is delivered to the exact location where it is required and/or desired.

Figure 9:
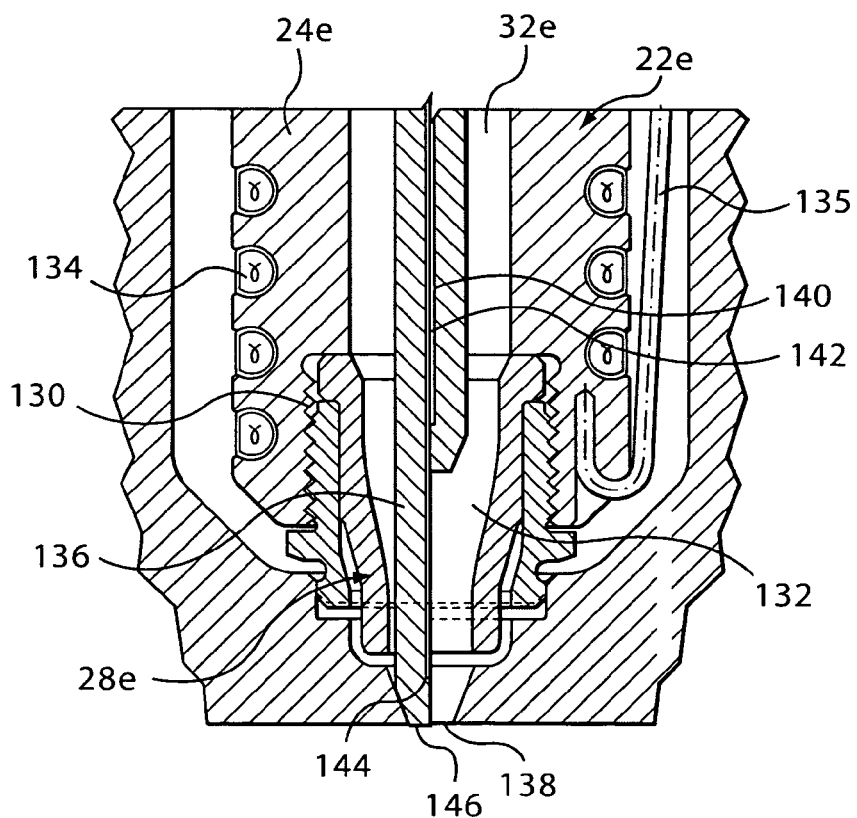
FIG. 9 is a side view partly in section of still another embodiment of the present invention.

Exemplary Injection Molding Apparatus Using Radiant Energy to Heat Having a Nozzle Tip Using a Waveguide FIG. 9 shows a nozzle 22e of an injection molding apparatus according to an embodiment of the present invention. The nozzle 22e can include a nozzle body 24e having a recess 130 formed therein for receiving a nozzle tip 28e. The nozzle tip 28e includes a melt channel 132 that is aligned with a nozzle channel 32e of the nozzle body 24e for receiving a melt stream therefrom. The nozzle body 24e is heated by an embedded heater 134. A thermocouple 135 is coupled to the nozzle body 24e to provide temperature measurements thereof.

A valve pin 136 extends through the nozzle channel 32e of the nozzle body 24e, and the melt channel 132 of the nozzle tip 28e, respectively, to selectively close a mold gate 138. The valve pin 136 is driven by a piston (not shown) that is movable within a cylinder (not shown). The valve pin 136 is shown divided along the length thereof for the purpose of illustrating the valve pin 136 in both the extended position, in which the mold gate 138 is closed, and the retracted position, in which the mold gate 138 is open.

A bore 140 is provided in the valve pin 136 for receiving a waveguide 142 (e.g., a fiber optic cable) that transmits radiant energy from a radiant energy source (not show) to a distal end 144 of waveguide 142. Distal end 144 of the waveguide 142 is located adjacent a forward end 146 of the valve pin 136. In various embodiments, the valve pin forward end 146 may be formed from, for example, H13, M2, or toolsteel.

In operation, a radiant energy wave is emitted from the distal end 144 of the waveguide 142. The infrared radiant energy of the radiant energy wave is absorbed by the valve pin forward end 146 at which it is directed, such that the radiant thermal energy of the infrared radiant energy heats the valve pin forward end 146. This can allow for improved valve pin closure of the mold gate 138 and improved process control. In particular, for small gate sizes closure of the mold gate 138 is improved. The ability to independently heat the valve pin forward end 146 or hot tip significantly improves processing capability of polymers through an injection molding apparatus.

Conclusion

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents fall within the scope of the invention.

What is claimed is:

1. An injection molding apparatus, comprising:
   an at least partially transparent nozzle having a nozzle body and a nozzle channel that receives a fluid material at an inlet, the fluid material having a pressure induced flow causing the fluid material to flow along an axis of the nozzle channel from the inlet to an outlet; and
   a radiant energy heating device that heats the nozzle channel to maintain the fluid material in a fluid state.

2. The injection molding apparatus of claim 1, further comprising:
   a manifold having a manifold channel and an outlet, the manifold channel receiving the fluid material under pressure, which leaves the manifold channel through the outlet to enter the inlet of the nozzle, wherein an axis of the outlet of the manifold channel is coaxial with the axis of the nozzle channel.

3. The injection molding apparatus of claim 1, wherein a surface of the nozzle comprises an internally reflective layer.

4. The injection molding apparatus of claim 3, wherein the radiant energy heating device directs at least part of the radiant energy towards the internally reflective layer.

5. The injection molding apparatus of claim 3, wherein the internally reflective layer is an infrared reflective coating selected from the group consisting of high reflective coatings, dielectric total reflector coatings and special reflective coatings that filter certain radiant energy frequencies.

6. The injection molding apparatus of claim 3, wherein the internally reflective layer is a metal fused to an outer surface of the nozzle and the metal is selected from the group consisting of aluminum or gold.

7. The injection molding apparatus of claim 1, wherein a surface of the nozzle channel comprises a radiant energy absorbing layer.

8. The injection molding apparatus of claim 7, wherein the radiant energy absorbing layer is a coating selected from the group consisting of titanium carbide and antireflective coatings.

9. The injection molding apparatus of claim 7, wherein the radiant energy absorbing layer is a metal sleeve.

10. The injection molding apparatus of claim 1, wherein:
    a surface of the nozzle comprises an internally reflective layer;
    a surface of the nozzle channel comprises a radiant energy absorbing layer; and
    radiant energy from the radiant energy heating device is reflected off the internally reflective layer and absorbed by the radiant energy absorbing layer to heat the nozzle channel.

11. The injection molding apparatus of claim 1, further comprising:
    a mold cavity that receives the fluid material from the nozzle channel via a mold gate.

12. The injection molding apparatus of claim 1, further comprising:
    a cavity in the nozzle body, wherein the radiant energy heating device is located in the cavity.

13. The injection molding apparatus of claim 12, wherein the cavity is formed in an inlet surface of the nozzle.

14. The injection molding apparatus of claim 12, wherein the cavity is a generally ring-shaped channel that surrounds the nozzle channel.

15. The injection molding apparatus of claim 1, wherein the nozzle comprises a first nozzle portion and a second nozzle portion, the first nozzle portion having a first mating surface and the second nozzle portion having a second mating surface, the first mating surface and the second mating surface being in abutment with one another.

16. The injection molding apparatus of claim 15, further comprising:
    a cavity in the nozzle body, wherein the radiant energy heating device is located in the cavity, wherein the cavity is provided in one of the first mating surface and the second mating surface.

17. The injection molding apparatus of claim 15, further comprising:
    a cavity in the nozzle body, wherein the radiant energy heating device is located in the cavity, wherein the cavity is partly formed in the first mating surface and partly formed in the second mating surface.

18. The injection molding apparatus of claim 1, wherein the radiant energy heating device comprises a radiation source.

19. The injection molding apparatus of claim 18, wherein the radiation source emits waves substantially in an infrared range or above.

20. The injection molding apparatus of claim 1, wherein the at least partially transparent material is selected from the group consisting of glass-ceramic, industrial sapphire, fused silica, borosilicate glass, or optical glass materials.

21. The injection molding apparatus of claim 1, wherein a tip of the nozzle includes a radiant energy absorbing layer coupled to an outer surface thereof.

22. The injection molding apparatus of claim 1, wherein:
    the nozzle has an elliptically-shaped cross-section;
    the nozzle channel is located along a first focal point axis of the elliptically-shaped cross-section; and
    the radiant energy heating device is located at least partially along a second focal point axis of the elliptically-shaped cross-section, such that the radiant energy heating device is parallel to the nozzle channel.

23. The injection molding apparatus of claim 22, wherein the nozzle channel receives waves from all incidence angles.

24. The injection molding apparatus of claim 1, wherein the nozzle includes a nozzle tip and the apparatus further comprises:
    a radiant energy waveguide having a distal end that emits the radiant energy, wherein the waveguide extends through the nozzle tip, such that the nozzle tip absorbs the radiant energy emitted from the waveguide.

25. The injection molding apparatus of claim 1, wherein the nozzle includes a nozzle tip and the apparatus further comprises:
- a valve pin extending through the nozzle channel, the valve pin having an end for selectively closing the outlet; and
- a radiant energy waveguide having a distal end that emits the radiant energy, wherein the waveguide extends through the a bore provided in the valve pin, such that the end of the valve pin absorbs the radiant energy emitted from the waveguide.

26. The injection molding apparatus of claim 1, wherein the nozzle includes a nozzle tip that includes the at least partially transparent portion of the nozzle and the apparatus further comprises:
- a radiant energy guiding section of the nozzle tip that has a distal end that emits the radiant energy, wherein the guiding section in located in the nozzle tip, such that at least a portion of the nozzle tip absorbs the radiant energy emitted from the guiding section.

* * * * *